July 9, 1957 N. K. LUND 2,798,944

SIGNAL SEEKING SELF ADJUSTING RADIO RECEIVING SYSTEM

Filed Oct. 9, 1953 3 Sheets-Sheet 1

INVENTOR
N. K. LUND
BY B. F. Stoddard
ATTORNEY

SIGNAL SEEKING SELF ADJUSTING RADIO RECEIVING SYSTEM

Filed Oct. 9, 1953 3 Sheets-Sheet 2

INVENTOR
N. K. LUND
BY [signature] Stoddard
ATTORNEY

INVENTOR
N. K. LUND
BY B. R. Stoddard.
ATTORNEY 2,798,944

SIGNAL SEEKING SELF ADJUSTING RADIO RECEIVING SYSTEM

Nean K. Lund, Berkeley Heights, N. J., assignor to Bell Telephone Laboratories, Incorporated, New York, N. Y., a corporation of New York Application October 9, 1953, Serial No. 385,122

18 Claims. (Cl. 250—6)

This invention relates to radiant energy signaling systems and, more particularly, to automatic tuning means for radiant energy receivers.

In certain types of radiant energy signaling systems, some of the receivers are located at remote points and are unattended. This creates a need for automatic means which can be remotely controlled to effect the tuning of such receivers to carrier energy of a particular desired frequency. Since the receivers are unattended, it is important that the automatic tuning means does not tune them to undesired carrier energy having somewhat the same frequency as the desired carrier energy. For example, the desired carrier energy might be accompanied by hum sidebands of the power frequency to which a receiver might become tuned. Also, it is important that the automatic tuning means does not lock a receiver to carrier energy having a received intensity lower than an assigned value.

Accordingly, it is an object of this invention to provide improved means for automatically tuning a radiant energy receiver to carrier energy having a particular desired frequency.

Another object of the invention is to provide means for preventing an automatically tuned radiant energy receiver from locking to undesired carrier energy having a frequency value closely related to that of desired carrier energy.

An additional object of this invention is to provide means for preventing an automatically tuned radiant energy receiver from being held tuned to carrier energy having a received intensity less than an assigned value.

The attainment of these and other objects of the invention is useful in various types of radiant energy signaling systems. It is particularly useful in overseas radio telephone communication systems because, in such systems, the operating frequencies of the radio transmitters and receivers are switched during the course of a day from one to another of several different assigned mean carrier frequencies within an allotted frequency transmission band in accordance with changes in the transmitting characteristics of the ether so as to obtain the best possible transmission and reception of the signals. Accordingly, for explanatory purposes, the invention will be described as being embodied in an overseas radio telephone communication system having a receiver of the twin-channel single-sideband type. It is to be understood that the invention is not limited to this particular system but may be applied to other types of systems and other types of receivers. With this explanation in mind, the means for accomplishing the above-mentioned and other objects of the invention will now be discussed in detail in connection with the following description of the drawing in which:

Figure 1:
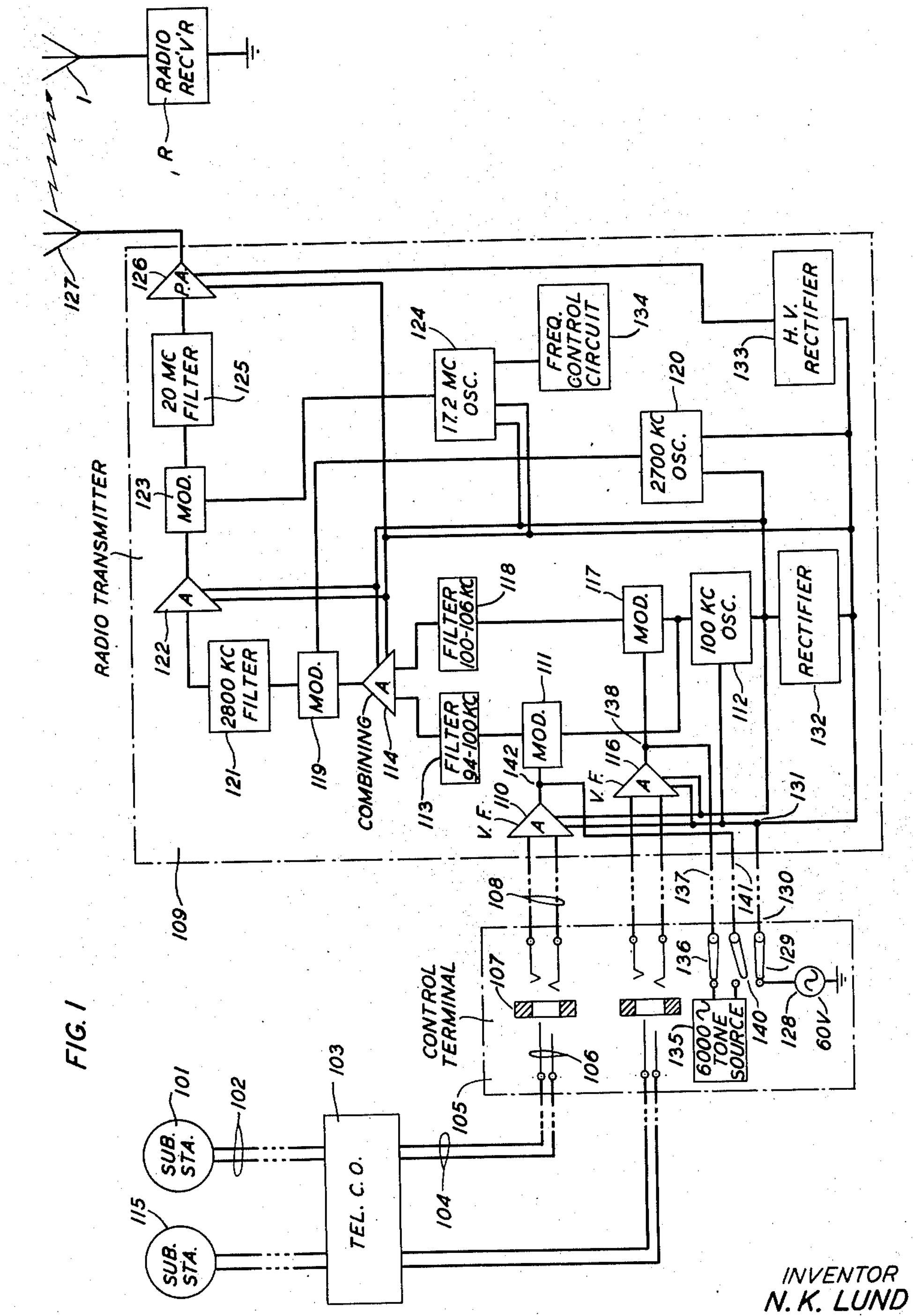
Fig. 1 is a block diagram of an overseas radio telephone communication system.

In the overseas radio telephone communication system shown in Fig. 1, telephone messages originating from a source 101, such as a telephone subscriber's station, are transmitted over wire lines 102 to a telephone central office 103 which, in turn, transmits the telephone signals over other wire lines 104 to a control terminal office 105. The wire line 104 is terminated in a plug 106 which is adapted to be inserted into a jack 107 connected over another wire line 108 to a radio transmitter 109. At the radio transmitter 109, the wire line 108 is connected to the input of a voice-frequency amplifier 110 having its output coupled to an input of a modulator 111. Another input of the modulator 111 is supplied with energy from a 100 kilocycle oscillator 112. The resulting output from the modulator 111 is delivered to a filter 113 having a passband extending from 94 kilocycles to 100 kilocycles. The output from the filter 113 is coupled to an input of a combining amplifier 114.

Since this is a twin-channel signaling system, the other input to the combining amplifier 114 is supplied with signals which originated from another source 115, such as another telephone subscriber's station. Telephone signals from the station 115 follow a path similar to that described above and are amplified by a voice-frequency amplifier 116 having its output coupled to one input of a modulator 117. The other input to the modulator 117 is supplied with energy from the 100 kilocycle oscillator 112. The output from the modulator 117 is delivered to a filter 118 having a passband extending from 100 kilocycles to 106 kilocycles. The output from the filter 118 is coupled to the second input of the combining amplifier 114.

The single output circuit of the combining amplifier 114 is coupled to an input of a modulator 119 which has its other input supplied with energy from a 2,700 kilocycle oscillator 120. The output from the modulator 119 is applied to a filter 121 having a narrow passband centering around 2,800 kilocycles and having its output coupled to an amplifier 122. The output from the amplifier 122 is coupled to an input of a modulator 123 which has its other input supplied with energy from a 17.2 megacycle oscillator 124. The output from the modulator 123 is applied to a filter 125 having a narrow passband centering around 20 megacycles and having its output coupled to a power amplifier 126 which, in turn, has its output coupled to a transmitting antenna 127. The antenna 127 radiates the signal-modulated carrier energy overseas to a receiving antenna 1 coupled to a radio receiver R which is shown in detail in Fig. 2.

Since it is intended that the radio receiver R will be automatically tuned to receive the 20 megacycle carrier radiated from the transmitter 109, it is desirable to employ some means for identifying this carrier so that the receiver R will not be incorrectly tuned to undesired carrier energy. This can be accomplished by superimposing a distinctive signal upon the carrier before it is transmitted. Such superimposition of an identifying signal can be performed in various ways as by modulating the amplitude, frequency, or phase of the carrier energy generated by the transmitter 109. It has been found desirable in this embodiment of the invention to modulate the amplitude of the carrier with a 6,000 cycle tone so as to produce a tone sideband having an amplitude equal to that of the carrier. Accordingly, a 6,000 cycle tone source 135, located at the control terminal 105, is connected by a manually operable "On-Off" switch 136 to a line 137 extending to the radio transmitter 109 and leading to a junction point 138 which is coupled to an input of the modulator 117. Consequently, the energy generated by the 100 kilocycle oscillator 112 will be modulated by the 6,000 cycle tone in addition to being modulated by telephone signals from the subscribers' stations 101 and 115.

As was stated above, in accordance with the usual practice in overseas radio telephone communication systems, the frequency of the electric energy generated by the carrier oscillator 124 is changed during the course of a day from one to another of several different assigned mean frequency values within the allotted frequency transmission band to correspond with changes in the transmitting characteristics of the ether so as to obtain the best possible transmission and reception of the signals. These frequency changes can be effected by utilizing any of several available methods known to those skilled in the art, such as by employing a frequency control circuit 134 for switching the frequency control of the oscillator 124 from one quartz crystal to another.

The radio transmitter 109 is operated by electric power from a conventional 60 cycle source 128 which is connected by a manually operable "On-Off" switch 129 over a line 130 extending to a junction point 131 at the radio transmitter 109. From the junction point 131, a portion of the alternating current from the source 128 is applied to a rectifier 132 and to a high-voltage rectifier 133. Other portions of the alternating current from the source 128 are applied over obvious paths to the filaments of the amplifiers 110, 114, 116, 122, and 126 and also to the filaments of the oscillators 112, 120, and 124. The output from the rectifier 132 is supplied over obvious paths to the plate circuits of the amplifiers 110, 114, 116, and 122 and to the plate circuits of the oscillators 112, 120, and 124. The plate circuit of the power amplifier 126 is supplied with energy from the high-voltage rectifier 133.

Due in part to the magnetic effect of the filament current from the 60 cycle source 128 modulating the electron streams within the various tubes mentioned above, the generation of carrier waves by the radio transmitter 109 will, as is well known to those skilled in the art, be accompanied by the incidental production of hum sidebands of the power frequency. As was stated above, one of the objects of this invention is to prevent the automatically tuned radio receiver R from being incorrectly tuned to one of these power hum sidebands, and the manner in which this is accomplished is explained hereinafter in connection with the following description of the twin-channel single-sideband radio receiver R shown in Fig. 2.

Figure 2:
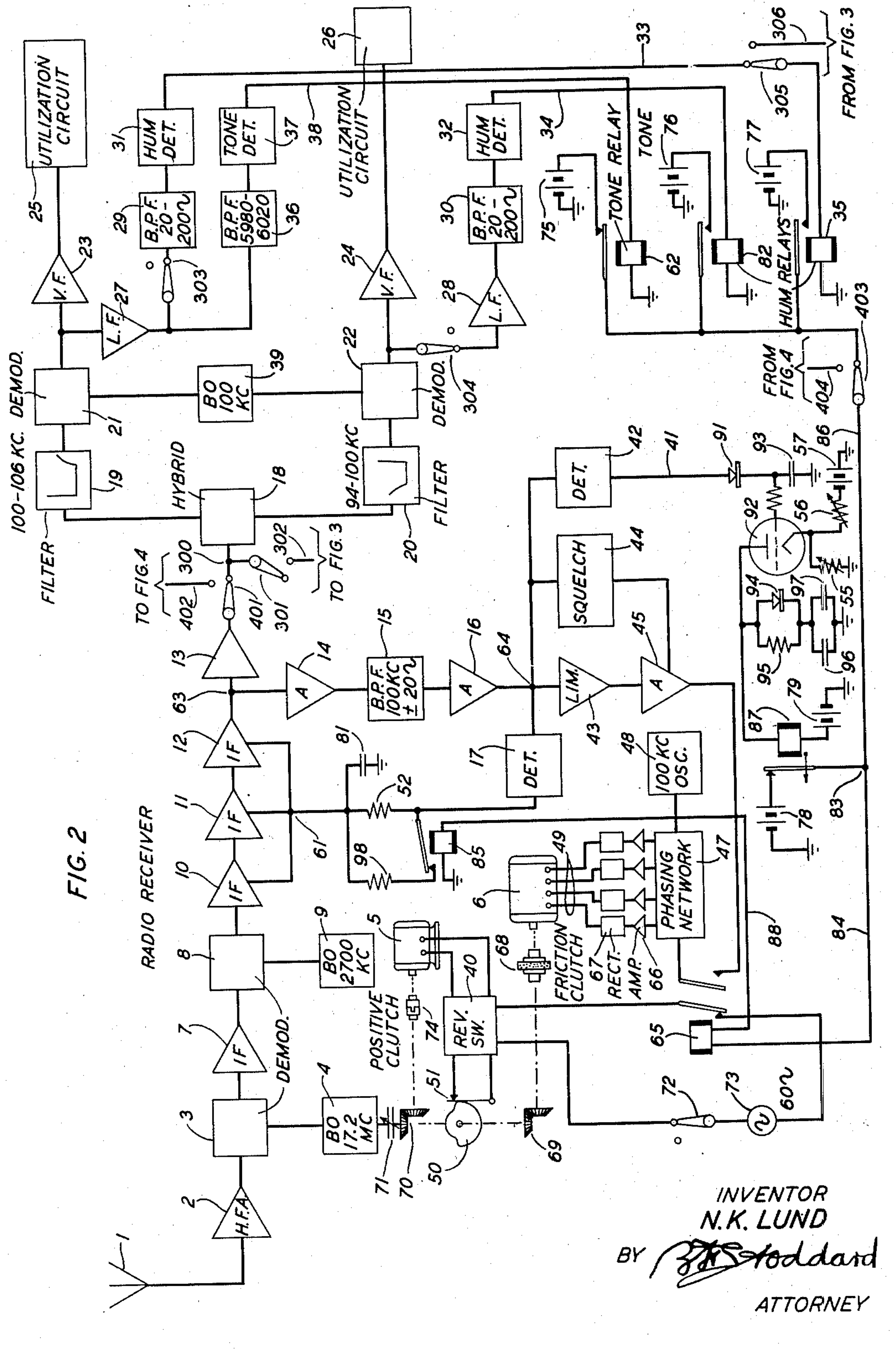
Fig. 2 is a detailed circuit diagram of a twin-channel single-sideband radio receiver used in the system shown in Fig. 1.

As can be seen in Fig. 2, the receiving antenna 1 of the radio receiver R is connected to a high frequency amplifier 2 having its output coupled to an input of a first demodulator 3. Another input of the first demodulator 3 is coupled to the output from a 17.2 megacycle first beating oscillator 4 which has its frequency automatically controlled by two motors 5 and 6 in a manner described hereinafter. The output from the first demodulator 3 is coupled to a first intermediate frequency amplifier 7 having its output coupled to a second demodulator 8. A 2,700 kilocycle second beating oscillator 9 has its output coupled to the second demodulator 8 which, in turn, has its output coupled to a four stage intermediate frequency amplifier represented by the amplifiers 10, 11, 12, and 13.

At a junction point 63 between the amplifiers 12 and 13, a portion of the intermediate frequency energy is applied to an automatic volume control circuit comprising an amplifier 14, a filter 15 having a passband of 100 kilocycles plus and minus 20 cycles, another amplifier 16, and a detector 17. The output of the detector 17 is coupled through a resistor 52 to a junction point 61 which is connected in parallel to the amplifiers 10, 11 and 12. It is to be noted that a resistor 98 is connected in shunt across the resistor 52 by an electric path which includes the armature of a relay 85. This shunt path is closed when the relay 85 is energized, and is opened when relay 85 releases its armature in response to being de-energized. The function of this shunt path and the means for controlling the energization of the relay 85 are described hereinafter.

The intermediate frequency output from the amplifier 13 is coupled over a switch 401 to a junction point 300 connected to a switch 301 and to a hybrid coil 18 which delivers the applied energy to two parallel circuits. The upper parallel circuit includes a bandpass filter 19 having a passband extending from 100 kilocycles to 106 kilocycles for passing energy from the upper of the twin-channel sidebands while the lower parallel circuit is provided with a bandpass filter 20 having a passband extending from 94 kilocycles to 100 kilocycles for passing energy from the lower of the twin signaling channels. Each of the filters 19 and 20 has its output coupled respectively to demodulators 21 and 22 which are also supplied with energy from a stable 100 kilocycle common beating oscillator 39. A portion of the output energy from each of the demodulators 21 and 22 is coupled respectively through voice frequency amplifiers 23 and 24 to their respectively associated utilization circuits 25 and 26.

Another portion of the output energy from each of the demodulators 21 and 22 is coupled respectively through low frequency amplifiers 27 and 28 to respectively associated bandpass filters 29 and 30 each having a 20 to 200 cycle passband. Switches 303 and 304 are connected respectively to the amplifiers 27 and 28 for a purpose that is explained hereinafter. The outputs from the filters 29 and 30 are supplied respectively to detectors 31 and 32. The output from the detector 31 is applied over a conductor 33 and a manually operable switch 305 to the winding of a marginal relay 35, and the output of the detector 32 is delivered over a conductor 34 to the winding of another marginal relay 82. It is to be noted that a portion of the output energy from the low frequency amplifier 27 is applied to a bandpass filter 36 having a 5980 to 6020 cycle passband. This filter 36 has its output coupled to a detector 37 which, in turn, has its output coupled over a conductor 38 to the winding of a third marginal relay 62. These marginal relays 35, 62 and 82 may be of any suitable conventional design requiring for the operation of their armatures the application to their energizing windings of potentials having magnitudes greater than an assigned value. The functions performed by the marginal relays 35, 62 and 82 are explained hereinafter.

As can be seen in Fig. 2, at a junction point 64, between the amplifier 16 and the detector 17 of the automatic volume control circuit, a portion of the intermediate frequency energy is supplied to a limiter 43 having its output coupled to an amplifier 45. A squelch circuit 44 is connected across the limiter 43 between the junction point 64 and another input to the amplifier 45. The output from the amplifier 45 is connected to the outer contact of a relay 65 which is shown to be in its energized condition with its armatures operated. When the relay 65 is deenergized by means described hereinafter, the release of its outer armature couples the output from the amplifier 45 to one input of a phasing network 47. The output from a stable 100 kilocycle beating oscillator 48 is coupled to another input of the phasing network 47. The quadrature voltage outputs from the phasing network 47 are amplified by amplifiers 66, are rectified by rectifiers 67, and are then applied over conductors 49 to an automatic tuning control motor 6. Through a friction clutch 68 and gears 69 and 70, the motor 6 drives a variable condenser 71 in the tuning circuit of the first beating oscillator 4 for varying its frequency as is more fully discussed hereinafter.

A cam 50 is mounted between the gears 69 and 70 for rotation therewith. When the cam 50 rotates it operates a contact 51 for controlling a reversible switch 40 which, in turn controls the operation of a sweep motor 5 connected thereto. One terminal of the switch 40 is connected through a manually operable "On-Off" switch 72 to one side of a conventional 60 cycle power supply source 73. The other side of the power source 73 is connected to the inner contact of the relay 65 which has its inner armature connected to another terminal of the switch 40. Accordingly, when relay 65 becomes energized in a manner described hereinafter, the operation of its inner armature completes the electric path from the source 73 to the reversible switch 40 for operating the sweep motor 5. Through a positive clutch 74, the motor 5 drives the gears 70 for causing the condenser 71 to vary the tuning of the first beating oscillator 4 as is more fully discussed hereinafter.

Another portion of the intermediate frequency energy is taken from the junction point 64 and is applied to a detector 42. The output from the detector 42 is applied over a conductor 41 to a germanium rectifier 91 coupled to the grid of a direct-current amplifier 92. The anode of the amplifier 92 is connected to a battery 79 through the winding of a marginal relay 87 which is of the slow-to-release type. Relay 87 is shown to be in its de-energized condition with its armature connecting a battery 78 to a junction point 83 between two leads 84 and 86. The lead 84 extends to one side of the winding of relay 65, the other side of this winding being connected by a lead 88 to the winding relay 85. The lead 86 connects the junction point 83 to the armatures of relays 35, 62, and 82. The functions performed by the amplifier 92 and the relay 87 are described hereinafter.

In describing the automatic tuning of the receiving circuit of Fig. 2 to the desired 20 megacycle carrier radiated by the radio transmitter 109 of Fig. 1, it will be assumed that the receiving circuit of Fig. 2 is initially not tuned to this carrier frequency. Accordingly, the frequency-adjusting equipment of Fig. 2 is shown to be in the condition for cyclically sweeping the frequency of the beating oscillator 4 over an assigned frequency range. The frequency range over which it is advisable to sweep the beating oscillator 4 depends upon the stability of the oscillators employed in both the radio transmitter 109 and the radio receiver R. For the purpose of explanation, it may be assumed that an assigned sweep range extending 5 kilocycles on each side of its assigned frequency of 17.2 megacycles will be satisfactory. It will also be assumed that at the beginning of the sweeping operation, no energy is passed by the carrier filter 15, the identifying tone filter 36, or the hum sideband filters 29 and 30. Consequently, relays 35, 62, 82, and 87 will not be energized at this time and their armatures will be in their released positions as is shown in Fig. 2.

Under this condition both batteries 75 and 78 will be connected to conductor 84 thereby energizing relays 65 and 85 and causing them to operate their armatures. The operation of the inner armature of relay 65 closes the power supply circuit extending through the reversing switch 40 to the sweep motor 5. This causes the motor 5 to drive the variable condenser 71 back and forth in accordance with the reversing action of the cam 50 and the switch 40 thus cyclically sweeping the frequency of the beating oscillator 4 over a range of about 5 kilocycles above and below its assigned frequency of 17.2 megacycles. During this time, the operated armature of relay 85 closes the shunt circuit across the resistor 52 thereby substituting the resistor 98 in the time-control circuit which includes the capacitor 81. Since the resistor 98 has a resistivity of 0.12 megohms whereas the resistor 52 has a resistivity of 2 megohms, the substitution at this time of the small resistor 98 renders this time-control circuit faster acting thereby accelerating the response time of the amplifiers 10, 11, and 12 so that they will reach their maximum gain more quickly.

When proper tuning is approached during the above-described sweeping operation, a portion of the demodulated energy will be passed by the intermediate frequency filter 15 and will enter the detector 42. The resulting direct-current output from the detector 42 will be applied over the conductor 41 to the grid of the direct-current amplifier 92. If the intensity of the output from the detector 42 is greater than an assigned value, as is discussed hereinafter, it will render the amplifier 92 conductive which, in turn, will effect the energization of the relay 87. Relay 87 will then operate its armature to disconnect battery 78 from conductor 84 leading to the windings of relays 65 and 85.

However, this in itself will not effect the deenergization of relays 65 and 85 unless the receiver is also tuned to correctly receive the 6,000 cycle identifying tone. When this occurs, the demodulated tone energy will be passed by the tone filter 36 to the tone detector 37. The resulting output from the detector 37 is applied over the conductor 38 to the winding of relay 62. Accordingly, the tone relay 62 operates its armature to disconnect battery 75 from relays 65 and 85 which thereupon release their armatures. The release of the inner armature of relay 65 opens the circuit from the power supply source 73 through the reversing switch 40 to the sweep motor 5. The release of the outer armature of relay 65 connects the amplifier 45 to the phasing network 47 for a purpose that is explained hereinafter. The release of the armature of relay 85 opens the shunt path across the resistor 52. This serves to make the time-control circuit which includes the condenser 81 slower acting thereby delaying the response time of the amplifiers 10, 11, and 12 so as to minimize excessive output volume changes when selective fading occurs.

Since it is important that the radio receiver should not be locked to a weak carrier having insufficient received intensity to produce good signals in the utilization circuits 25 and 26, the operating threshold potential level of the amplifier 92 is adjusted in such a manner that the amplifier 92 will not be rendered conductive in response to the reception of carrier energy having an intensity less than an assigned value. In this embodiment of the invention, this is accomplished by adjusting two variable resistors 55 and 56 which are connected between the cathode of the amplifier 92 and its associated battery 57. Therefore, even though the radio receiver should become tuned to carrier energy of the desired frequency, it will not become locked to this carrier unless the intensity of the received carrier is sufficient to render the amplifier 92 conductive. If the intensity of the received carrier is too weak to accomplish this, then the armature of relay 87 will remain in its released position and the motor 5 will continue the sweeping operation.

It should be noted that relay 87 is of the slow-to-release type in order to prevent a momentary fading in the strength of the received carrier from effecting the release of its armature after it has been operated. This is desirable because such a release of the armature of relay 87 would initiate an undesired resumption of the sweeping action. Conversely, it is desirable that relay 87 should operate its armature quickly so as to stop the sweeping action just as soon as the receiving circuit is correctly tuned because otherwise the sweep might be continued beyond the point at which the desired energy could be admitted by the filters 15 and 36 thus making it impossible for the receiver to lock to the desired carrier frequency. Accordingly, auxiliary means constituted by two timing circuits are provided for causing relay 87 to operate its armature quickly and to release it slowly.

One of these timing circuits is connected by resistance coupling to the grid circuit of the amplifier 92 and includes the germanium rectifier 91 and a condenser 93 which, in this embodiment of the invention, has a capacitance of four microfarads. The condenser 93 is charged quickly and discharged slowly because of the difference in the forward and reverse resistance of the germanium rectifier 91. On discharge, this timing circuit has a time constant of about eight seconds.

The second timing circuit is connected across the winding of the relay 87 so as to maintain it energized for a short time after the plate current of the amplifier 92 drops to zero. This timing circuit comprises a germanium rectifier 94 connected in parallel with a resistor 95 which, in this embodiment of the invention, has a resistance of 8,200 ohms. The rectifier 94 and the resistor 95 are connected to two condensers 96 and 97 which are connected in parallel. In this embodiment of the invention, each of the condensers 96 and 97 has a capacitance of 50 microfarads. The time constant of this timing circuit is approximately 1.6 seconds.

Thus, it can be understood that the automatic tuning control circuit of Fig. 2, as so far described, will sweep the frequency of the beating oscillator 4 until both the carrier and its accompanying identifying tone are tuned in, at which time the relays 65 and 85 are de-energized for effecting the stopping of the sweep motor 5.

In order to make corrections for any subsequent drifting that may occur in the frequency of the oscillators at either the transmitting station or at the receiving station, the release of the outer armature of relay 65 is designed to close what may be termed a fine tuning adjustment circuit. This circuit extends from the output of the amplifier 45 over the released outer armature of relay 65 to the phasing network 47 which is also supplied with the output from a stable 100 kilocycle oscillator 48. Accordingly, the intermediate frequency energy passed by the filter 15, which has a 40 cycle passband centered at 100 kilocycles, is combined in the phasing network 47 with the 100 kilocycle energy from the oscillator 48 to produce a quadrature output in a manner well known to those skilled in the art. The output from the phasing network 47 is supplied through the amplifiers 66 to the rectifiers 67 for producing beat frequencies which are applied to the two-phase motor 6. This causes the motor 6 to drive the gears 69 through the friction clutch 68 thereby varying the capacitance of the condenser 71.

This changes the tuning of the beating oscillator 4 until the frequency of the intermediate frequency energy passed by the filter 15 corresponds with the frequency of the stable oscillator 48. When this occurs, no beat frequency will be produced in the rectifiers 67 and, consequently, the operation of the motor 6 will be stopped. Since the passband of the filter 15 is only 40 cycles wide, it can be understood that the frequency changes effected by the motor 6 will be over a much narrower range than those effected by the motor 5 which, as was stated above, causes the frequency of the beating oscillator 4 to be cyclically swept over a frequency range of 10 kilocycles.

As was explained above, the use of the 60 cycle power supply for operating the radio transmitter 109 causes the generation of carrier waves thereat to be accompanied by the incidental production of hum sidebands of the power frequency. Since these power hum sidebands are only 60 cycles removed from the 20 megacycle carrier, their reception and demodulation in the receiving circuit of Fig. 2 will produce energy having frequencies so closely related to the desired frequency that, during the sweep tuning procedure, it may pass through the filter 15 and the filter 36. When this occurs, the outputs from filters 15 and 36 will cause relays 87 and 62 to operate their armatures to disconnect batteries 78 and 75 from the windings of relays 65 and 85. Therefore, unless some other battery is connected to relays 65 and 85, they will release their armatures to cause the sweeping operation to be stopped with the receiving circuit locked to a power hum sideband.

The prevention of such incorrect tuning lock-ups can be accomplished by making use of the fact that a power hum sideband is always smaller in amplitude than its associated carrier. For example, in the particular embodiment of the invention described herein, the amplitude of a power hum sideband is at least 19 decibels lower than the amplitude of the carrier. The significance of this difference in amplitude is that, when the receiving circuit is tuned to a power hum sideband, the automatic volume control voltage produced by the automatic volume control circuit 14—15—16—17 will cause the volume of the output of the receiving circuit to be at least 19 decibels higher than normal. Since this abnormally high volume indicates that the receiving circuit is not properly tuned, it can be employed to effect the continuance of the sweep action until the receiving circuit is correctly tuned to the desired carrier frequency.

One method of using this abnormally high volume to prevent the tuning of the receiving circuit from being locked to a power hum sideband is to employ the rectified outputs from the detectors 31 and 32 as tuning control voltages. When the receiving circuit is correctly tuned, any energy that is passed by either of the hum sideband filters 29 and 30 is of such low amplitude that, upon being rectified by the respectively associated detectors 31 and 32, it is too weak to effect the operation of the armature of either of the marginal relays 35 or 82. However, when the receiving circuit is tuned to a power hum sideband, the above-mentioned increased automatic volume control action will raise the amplitude of the energy applied to the hybrid coil 18 at least 19 decibels higher than normal.

Accordingly, the energy now passed by the power hum filter 29 or 30 in the sideband path to which the receiver is now tuned, will be of such high amplitude that, when it is rectified by the associated detector 31 or 32, the resulting high-level direct-current output will cause the associated relay 35 or 82 to operate its armature to connect either battery 77 or 76 over a manually operable switch 403 to the conductors 86 and 84 leading to the windings of relays 65 and 85. This serves to maintain the relays 65 and 85 in an energized condition, thereby causing the motor 5 to continue the frequency sweeping operation of the beating oscillator 4 until the receiving circuit is correctly tuned.

When the receiving circuit becomes correctly tuned, the automatic volume control voltage drops to its normal value with the result that any energy that is now passed by the hum sideband filters 29 and 30 is of insufficient level to effect the holding of the armature of either relay 35 or 82 in an operated condition. Consequently, no battery will now be connected to the lead 84 with the result that relays 65 and 85 will become de-energized and the frequency sweeping action of the beating oscillator 4 will be stopped.

Instead of extracting the hum sideband energy from each of the twin-channel paths separately by means of the two 200 cycle filters 29 and 30, an alternative method is to extract it by means of a single 400 cycle filter located at a point in the receiving circuit ahead of the hybrid coil 18. This alternative method will now be described with reference to both Figs. 2 and 3. The first step is to close the manually operable switch 301 shown in Fig. 2. This serves to supply a portion of the intermediate frequency output energy from the amplifier 13 to a conductor 302 leading to the circuit shown in Fig. 3. The next step is to open the manually operable switches 303 and 304, shown in Fig. 2, thereby disconnecting the two 200 cycle filters 29 and 30 from the receiving circuit. Thirdly, the manually operable switch 305 should be moved out of engagement with its contact connected to the lead 33 and into engagement with its contact connected to a conductor 306 leading to the circuit shown in Fig. 3.

Figure 3:
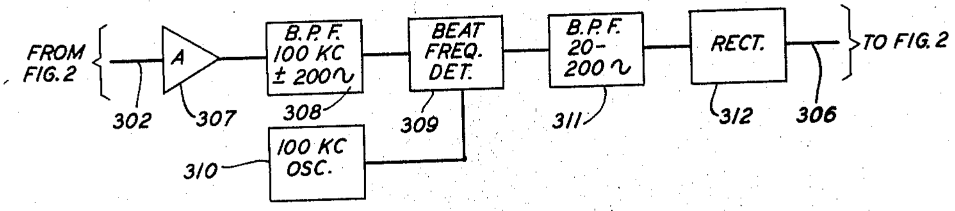
Fig. 3 is a diagram of an alternative circuit construction of a portion of the receiving circuit shown in Fig. 2.

The intermediate frequency energy supplied over the switch 301 travels over the conductor 302 to the circuit of Fig. 3 where it is amplified by an amplifier 307 and then is applied to a filter 308 having a passband of 100 kilocycles plus and minus 200 cycles. The output from the filter 308 is coupled to an input of a beat frequency detector 309. Another input of the detector 309 is supplied with energy from a stable 100 kilocycle oscillator 310. If the intermediate frequency energy from the filter 308 has a frequency of exactly 100 kilocycles, then there will be no output from the detector 309. However, if the output energy from the filter 308 contains frequencies above or below 100 kilocycles, then the beat frequency detector 309 will produce an output corresponding to the frequency difference between the energy from the filter 308 and the energy from the oscillator 310. This output from the detector 309 is applied to a filter 311 having a 20 to 200 cycle passband. The output from the filter 311 is applied to a rectifier 312 which delivers its output energy to the conductor 306 leading to the circuit shown in Fig. 2.

The circuit shown in Fig. 3 functions in much the same manner as its corresponding portion of the circuit, shown in Fig. 2. Thus, if the receiving circuit should become tuned to a power hum sideband, then the above-mentioned increased automatic volume control action would raise the amplitude of the output energy from the amplifier 13 at least 19 decibels higher than normal. A portion of this higher level intermediate frequency energy would now be applied through the amplifier 307 and filter 308 to the beat frequency detector 309. Since it is assumed that the receiving circuit is incorrectly tuned at this time, the output from the filter 308 will contain frequencies above or below 100 kilocycles. Consequently, the beat frequency detector will now produce corresponding output energy which will be supplied through the filter 311 to the rectifier 312. The resulting output energy from the rectifier 312 will then be delivered over the conductor 306 to the circuit of Fig. 2. Here, it will be applied over the switch 305 to the winding of the marginal hum relay 35.

Due to the increased automatic gain control action, the output energy from the rectifier 312 that is now applied to the winding of the marginal relay 35 will be of such high level as to effect the operation of the armature of relay 35. This connects battery 77 over the switch 402 to the conductors 86 and 84 leading to the windings of relays 65 and 85. This serves to maintain the relays 65 and 85 in an energized condition, thereby causing the motor 5 to continue the frequency sweeping operation of the beating oscillator 4 until the receiving circuit is correctly tuned.

When the receiving circuit is correctly tuned, the automatic volume control voltage drops to its normal value with the result that any energy, such as might be produced by noise currents, that is now passed by the filter 308 will be of insufficient level to effect the holding of the armature of the marginal hum relay 35 in its operated position. Consequently, relay 35 will now release its armature thereby disconnecting battery 77 from the windings of relays 65 and 85 with the result that these relays will become de-energized and will release their armatures to effect the stopping of the frequency sweeping action of the beating oscillator 4.

Another alternative method for preventing the tuning of the radio receiving circuit from becoming locked to a power hum sideband includes the transmission of a tone over each of the twin signaling channels. Then, if the receiving circuit should become tuned to a power hum sideband, the two tone outputs from the intermediate frequency stage of the receiving circuit would have different frequencies which, when applied to a beat frequency detector, would produce a difference frequency tone. Rectification of this difference frequency tone produce a direct current for controlling the energization of a relay which, in turn, causes the frequency-sweeping operation to continue until the receiving circuit becomes properly tuned, at which time the difference frequency will become zero. This alternative method will now be described with reference to Figs. 1, 2 and 4.

The first step in practicing this method is to close the manually operable switch 140 shown in Fig. 1. This serves to connect the 6000 cycle tone source 135, located at the control terminal 105, to a line 141 extending to the radio transmitter 109 and leading to a junction point 142 which is coupled to an input of the modulator 111. Consequently, the carrier energy transmitted over each of the twin signaling channels will now be modulated with a 6000 cycle tone. The second step in following this method is to move the manually operable switch 401, shown in Fig. 2, out of engagement with its contact connected to the hybrid coil 18 and into engagement with its contact connected to a conductor 402 leading to the circuit shown in Fig. 4. Thirdly, the manually operable switch 403 in Fig. 2 should be moved out of engagement with its contact connected to the armatures of the relays 35, 62, and 82 and into enegagement with its contact connected to a lead 404 extending to the circuit shown in Fig. 4.

Figure 4:
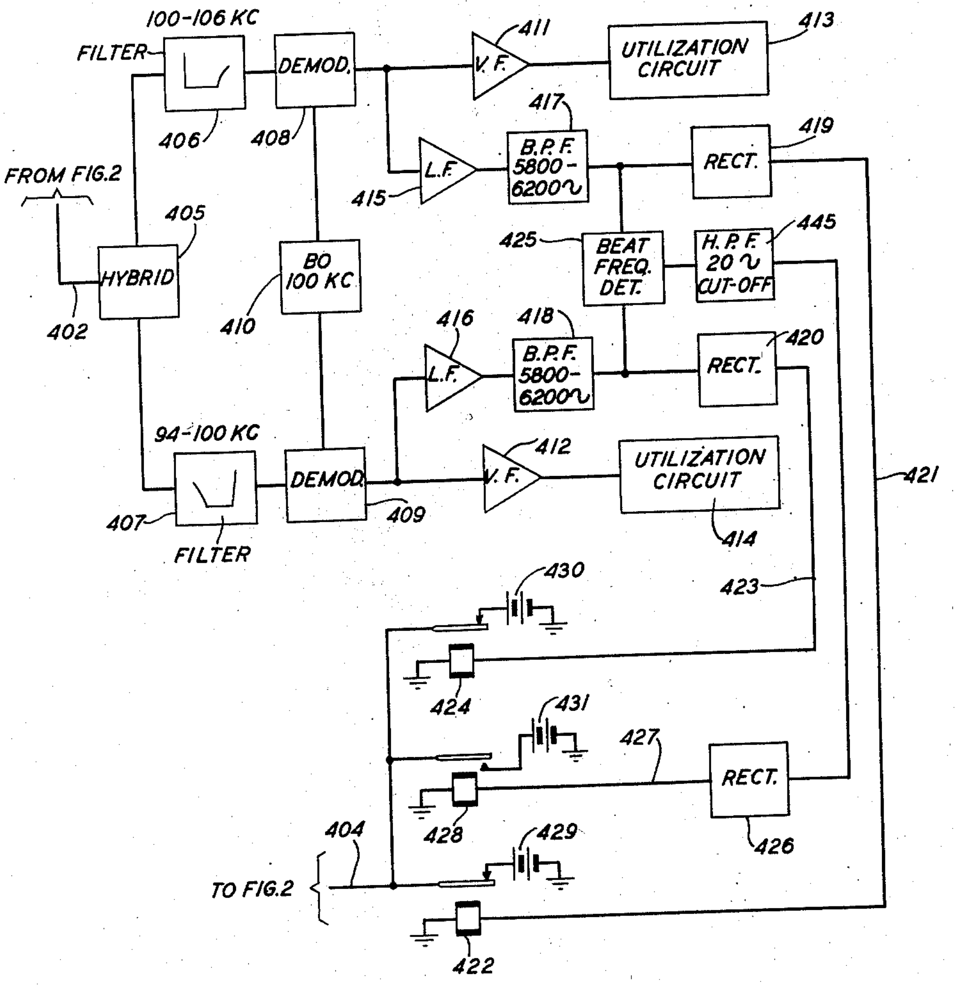
Fig. 4 is a diagram of an alternative circuit configuration of another portion of the receiving circuit of Fig. 2.

The above-described operation of the switch 401 serves to apply the intermediate frequency output energy from the amplifier 13 over the conductor 402 to the hybrid coil 405 in the circuit of Fig. 4. From the hybrid coil 405, the intermediate frequency energy is applied to two parallel circuits. The upper parallel circuit includes a bandpass filter 406 having a passband extending from 100 kilocycles to 106 kilocycles for passing energy from the upper of the twin channel sidebands while the lower parallel circuit is provided with a bandpass filter 407 having a passband extending from 94 kilocycles to 100 kilocycles for passing energy from the lower of the twin signaling channels. Each of the filters 406 and 407 has its output coupled respectively to demodulators 408 and 409 which are also supplied with enegy from a stable 100 kilocycle common beating oscillator 410. A portion of the output energy from each of the demodulators 408 and 409 is coupled respectively through voice frequency amplifiers 411 and 412 to their respectively associated utilization circuits 413 and 414.

Another portion of the output energy from each of the demodulators 408 and 409 is coupled respectively through low frequency amplifiers 415 and 416 to respectively associated bandpass filters 417 and 418 each having a 5800–6200 cycle passband. Portions of the output energy from each of the filters 417 and 418 are supplied respectively to rectifiers 419 and 420. The output from the rectifier 419 is applied over a lead 421 to the winding of a marginal relay 422, and the output from the rectifier 420 is delivered over a conductor 423 to the winding of another marginal relay 424. Portions of the outputs from the filters 417 and 418 are also supplied to a beat frequency detector 425 which has its output coupled to a high pass filter 445 having a 20 cycle cut-off. The output from the filter 425 is coupled to a rectifier 426 which has its output applied over a lead 427 to the winding of another marginal relay 428. The marginal relays 422, 424 and 428 resemble the marginal relays 35, 62, and 82 shown in Fig. 2 in that they may be of any suitable conventional design requiring for the operation of their armatures the application to their energizing windings of potentials having magnitudes greater than an assigned value. The armature of each of the relays 422, 424, and 428 is connected to the conductor 404 leading to the circuit shown in Fig. 2.

In automatically tuning this receiving circuit to the desired carrier frequency, the relays 65 and 85 are energized by current from battery 78, as was explained above. These relays 65 and 85 are also supplied with current from batteries 429 and 430 over a path which includes the released armatures of relays 422 and 424, conductor 404, switch 403, and leads 86 and 84. When proper tuning is approached, relay 87 will become energized in the manner described above and will operate its armature to disconnect battery 78 from the windings of relays 65 and 85.

However, this will not effect the de-energization of relays 65 and 85 unless the receiver is also tuned to correctly receive the 6000 cycle identifying tone over each twin signaling channel. When this occurs, the tone energy will be passed by the filters 417 and 418 to the rectifiers 419 and 420, respectively. The resulting direct current outputs from the rectifiers 419 and 420 will now have magnitudes sufficiently large to effect the operation of the armatures of the marginal relays 422 and 424 thereby disconnecting batteries 429 and 430 from the windings of relays 65 and 85.

In the event the receiving circuit should become incorrectly tuned to a power hum sideband, the output energy from the tone filters 417 and 418 will contain dissimilar frequencies. Consequently, when the output energy from the filters 417 and 418 is now applied to the beat frequency detector 425, the detector 425 will produce a difference frequency tone. For example, if the receiver should become tuned to the first power hum sideband which is 60 cycles removed from the desired carrier frequency, then the tone passed by filter 417 in the upper of the twin channel sidebands would have a frequency of 6060 cycles while the tone passed by the filter 418 in the lower of the twin signaling channels would have a frequency of 5940 cycles, thus causing the beat frequency detector to produce a difference frequency tone of 120 cycles. This difference frequency tone will now be delivered to the rectifier 426 and, upon rectification, direct current energy will be produced having sufficient magnitude to effect the operation of the armature of the marginal relay 428. The operation of the armature of relay 428 serves to connect battery 431 to the path extending along conductor 404, over switch 403, and along the leads 86 and 84 to the windings of relays 65 and 85. Accordingly, the frequency-sweeping operation of the beating oscillator 4 will be continued until the receiving circuit is correctly tuned.

When the receiving circuit becomes correctly tuned, the frequency values of the outputs from the tone filters 417 and 418 will be substantially the same with the result that the difference frequency will approach zero. Due to the high pass filter 445 having a 20 cycle cut-off, its output will be substantially zero when the difference frequency is less than 20 cycles. Accordingly, any energy, such as that produced by noise currents, that may now be supplied to the winding of the marginal relay 428 will be of insufficient magnitude to effect the holding of its armature in its operated condition. Relay 428 will, therefore, now release its armature to disconnect battery 431 from the windings of relays 65 and 85. Since no battery will now be connected to the windings of these relays 65 and 85, the frequency-sweeping operation of the beating oscillator 4 will be stopped.

These particular embodiments of the invention have been described in order to explain the principles and features of operation of the invention. It is to be understood that the invention is not to be limited to the specific circuit constructions shown in the drawing as various other modifications may be made without exceeding the scope of the invention which is to be limited only by the claims appended hereto.

What is claimed is:

1. A radiant energy signaling system comprising in combination a transmitting station having means for radiating carrier waves, a receiving station having a receiver for receiving said radiated carrier waves, said receiver including a beating oscillator having frequency-adjusting means for cyclically sweeping its frequency over an assigned frequency range, demodulating means for combining said received carrier energy with the output energy from said beating oscillator for producing intermediate frequency energy, control means for controlling the operation of said frequency-adjusting means, said control means including first electroresponsive means, a first circuit for energizing said first electroresponsive means, an electromagnetic relay having an armature for effecting the alternative opening and closing of said first circuit, a second circuit for energizing said relay to operate its armature, said second circuit including a thermionic tube having at least a first electrode and a second electrode, means for deriving potentials from said intermediate frequency energy and for applying them to said first electrode for rendering said tube conductive, auxiliary means for causing said relay to operate its armature quickly and to release it slowly, said auxiliary means including a first timing circuit comprising a capacitor and a first germanium rectifier, means for connecting said germanium rectifier between said potential-deriving means and said capacitor, and means for coupling said germanium rectifier to said first electrode.

2. A radiant energy signaling system in accordance with claim 1 wherein said auxiliary means include a second timing circuit comprising a resistor connected in parallel with a second germanium rectifier, and means for coupling said second electrode to said parallel-connected resistor and second germanium rectifier.

3. A radiant energy signaling system including in combination a transmitting station comprising means for generating carrier waves, a source of tone energy having an assigned frequency, means in said transmitter for modulating said carrier waves with said tone energy, means for radiating said tone-modulated carrier waves, a receiving station having a receiver for receiving said tone-modulated carrier waves, said receiver including a beating oscillator having frequency-adjusting means for cyclically sweeping its frequency over an assigned frequency range, demodulating means for combining said received carrier energy with the output energy from said beating oscillator for producing intermediate frequency energy, first electroresponsive means for controlling the operation of said frequency-adjusting means, a control circuit for energizing said first electroresponsive means, said control circuit having first and second parallel paths, a first source of electric current, a second source of electric current second electroresponsive means for controlling the connection of said first source to said first parallel path, third electroresponsive means for controlling the connection of said second source to said second parallel path, first frequency-selective means for deriving energy having frequencies within an assigned band from said intermediate frequency energy and for applying said derived energy to said second electroresponsive means, said second electroresponsive means being responsive to the application thereto of said derived energy having magnitudes in excess of an assigned value, and second frequency-selective means for separating said tone energy from said intermediate frequency energy and for applying said separated tone energy to said third electroresponsive means, said third electroresponsive means being responsive to the application thereto of said separated tone energy having magnitudes in excess of an assigned value.

4. A radiant energy signaling system comprising in combination a transmitting station having means for radiating carrier waves, a receiving station having a receiver for receiving said radiated carrier waves, said receiver including a beating oscillator, first frequency-adjusting means for cyclically sweeping the frequency of said beating oscillator over an assigned frequency range, second frequency-adjusting means for varying the frequency of said beating oscillator, frequency-responsive means for controlling the operation of said second-frequency adjusting means, demodulating means for combining said received carrier energy with the output energy from said beating oscillator for producing intermediate frequency energy, frequency-selective means for selecting intermediate frequency energy having frequencies with an assigned frequency band, a source of electric energy having a stable frequency lying within the center of said band, means for connecting said source to said frequency-responsive means, and control means for effecting the stopping of the operation of said first frequency-adjusting means and for simultaneously applying said selected energy to said frequency-responsive means, said frequency-responsive means being responsive only to a difference between the frequency of said selected energy and said stable frequency.

5. A radiant energy signaling system in accordance with claim 4 wherein said control means include first electroresponsive means, energizing means for energizing said first electroresponsive means second electroresponsive means for controlling said energizing means, rectifying means for rectifying said selected energy, and means for applying the output energy from said rectifying means to said second electroresponsive means, said second electroresponsive means being responsive only to the application thereto of said applied output energy having magnitudes in excess of an assigned value.

6. A radiant energy signaling system comprising in combination a transmitting station having means for radiating carrier waves, a receiving station having means for receiving said radiated carrier waves, said receiver including a beating oscillator having frequency-adjusting means for cyclically sweeping its frequency over an assigned frequency range, demodulating means for combining said received carried energy with the output energy from said beating oscillator for producing intermediate frequency energy, an intermediate frequency amplifier, an automatic gain control feedback circuit for varying the gain of said amplifier in accordance with the amplitude of said intermediate frequency energy, first control means for varying the response time of said intermediate frequency amplifier, said first control means including a resistor in said feedback circuit and a circuit for shunting said resistor, said first control means also comprising electroresponsive means for alternatively closing and opening said shunt circuit, second control means for controlling the operation of said frequency-adjusting means and for simultaneously controlling the operation of said electroresponsive means in said first control means, and means for deriving control potentials from said automatic gain control feedback circuit and for applying them to said second control means, said second control means being responsive to applied control potentials having magnitudes in excess of an assigned value.

7. A radiant energy signaling system comprising in combination a transmitting station having means for radiating carrier waves, a receiving station having means for receiving said radiated carrier waves, said receiver including a beating oscillator having frequency-adjusting means for cyclically sweeping its frequency over an assigned frequency range, demodulating means for combining said received carrier energy with the output energy from said beating oscillator for producing intermediate frequency energy, an intermediate frequency amplifier, a circuit for controlling the gain of said amplifier in response to the amplitude of said intermediate frequency energy, first means for accelerating the response time of said amplifier, second means for delaying the response time of said amplifier, first control means having a first condition for enabling said first means and for simultaneously disabling said second means, said first control means having a second condition for disabling said first means and for simultaneously enabling said second means, second control means having a first condition for effecting the starting of the operation of said frequency-adjusting means and for simultaneously placing said first control means in its first condition, said second control means having a second condition for effecting the stopping of the operation of said frequency-adjusting means and for simultaneously placing said first control means in its second condition, and third control means for placing said second control means in its first and second conditions alternatively, said third control means including means for deriving control potentials from said gain control circuit.

8. A radiant energy signaling system comprising in combination a transmitting station including a transmitter, a source of electric power having an assigned frequency, means for coupling said source to said transmitter, means in said transmitter for utilizing the power from said source for generating carrier waves, the generation of said carrier waves being accompanied by the incidental production of hum sidebands of said power frequency, means for radiating said carrier waves together with said hum sidebands, a receiving station having a receiver for receiving said radiated carrier waves and power hum sidebands, said receiver including a beating oscillator having a frequency-adjusting means for cyclically sweeping its frequency over an assigned frequency range, demodulating means for combining said received energy with the output energy from said beating oscillator for producing intermediate frequency energy, control means for controlling the operation of said frequency-adjusting means, and frequency-selective means in said receiver for separating said hum sideband energy from said intermediate frequency energy and for applying said separated energy to said control means, the magnitude of said separated energy being variant, said control means including means actuated in response to the application thereto of said separated hum sideband energy having magnitudes in excess of an assigned value.

9. A radiant energy signaling system comprising in combination a transmitting station including a transmitter, a source of electric power having an assigned frequency, means for coupling said source to said transmitter, means in said transmitter for utilizing the power from said source for generating carrier waves, the generation of said carrier waves being accompanied by the incidental production of hum sidebands of said power frequency, means for radiating said carrier waves together with said hum sidebands, a receiving station having a receiver for receiving said radiated carrier waves and hum sidebands, said receiver including a beating oscillator having frequency-adjusting means for cyclically sweeping its frequency over an assigned frequency range, demodulating means for combining said received energy with the output energy from said beating oscillator for producing intermediate frequency energy, an automatic volume control circuit in said receiver, means for supplying said circuit with intermediate frequency energy from said demodulating means, first control means for controlling the operation of said frequency-adjusting means, means for deriving first control potentials from said automatic volume control circuit and for applying them to said first control means, said first control means being responsive to the application thereto of first control potentials having magnitudes in excess of a first assigned value, and second control means for controlling the operation of said frequency-adjusting means, frequency-selective means in said receiver for separating said hum sideband energy from said intermediate frequency energy, and means for deriving second control potentials from said separated hum sideband energy and for applying them to said second control means, said second control means being responsive to the application thereto of said second control potentials having magnitudes in excess of a second assigned value.

10. A radiant energy signaling system comprising in combination a transmitting station including a transmitter, a source of electric power having an assigned frequency, means for coupling said source to said transmitter, means in said transmitter for utilizing the power from said source for generating carrier waves, the generation of said carrier waves being accompanied by the incidental production of hum sidebands of said power frequency, means for radiating said carrier waves together with said hum sidebands, a receiving station having a receiver for receiving said radiated carrier waves and hum sidebands, said receiver including a beating oscillator having frequency-adjusting means for cyclically sweeping its frequency over an assigned frequency range, demodulating means for combining said received energy with the output energy from said beating oscillator for producing intermediate frequency energy, first electroresponsive means for alternatively starting and stopping the operation of said frequency-adjusting means in accordance with the alternative energization and de-energization of said first electroresponsive means, second electroresponsive means for alternatively energizing and de-energizing said first electroresponsive means, first frequency-selective means for extracting energy having frequencies within an assigned band from said intermediate frequency energy, said band of frequencies having limits such as to permit the inclusion of said hum sideband energy, means for deriving control potentials from said extracted energy and for applying them to said second electroresponsive means, third electroresponsive means for alternatively energizing and de-energizing said first electroresponsive means, second frequency-selective means for separating said hum sideband energy from said intermediate frequency energy, and means for deriving control potentials from said separated hum sideband energy and for applying them to said third electroresponsive means.

11. A radiant energy signaling system comprising in combination a transmitting station including a transmitter, a source of electric power having a predetermined frequency, means for coupling said source to said transmitter means in said transmitter for utilizing the power from said source for generating carrier waves, the generation of said carrier waves being accompanied by the incidental production of hum sidebands of said power frequency, means for radiating said carrier waves together with said hum sidebands, a receiving station having a receiver for receiving said radiated carrier waves and hum sidebands said receiver including a beating oscillator having frequency-adjusting means for cyclically sweeping its frequency over an assigned frequency range, demodulating means for combining said received energy with the output energy from said beating oscillator for producing intermediate frequency energy, control means for alternatively starting and stopping the operation of said frequency-adjusting means, first frequency-selective means for deriving energy having frequencies within an assigned band from said intermediate frequency energy and for applying them to said control means, said control means including first means actuated in response to the application thereto of said derived energy having magnitudes in excess of an assigned value, and second frequency-selective means for separating said hum sideband energy from said intermediate frequency energy and for applying said separated energy to said control means, said control means including second means actuated in response to the application thereto of said separated hum sideband energy having magnitudes in excess of an assigned value, said control means being responsive to the non-actuation of said first means for effecting the starting of said frequency-adjusting means, said control means also being responsive to the actuation of said second means for effecting the starting of said frequency-adjusting means, said control means being further responsive to the actuation of said first means during the non-actuation of said second means for effecting the stopping of said frequency-adjusting means.

12. A radiant energy signaling system comprising in combination a transmitting station including a transmitter, a source of electric power having a predetermined frequency, means for coupling said source to said transmitter, means in said transmitter for utilizing the power from said source for generating carrier waves, the generation of said carrier waves being accompanied by the incidental production of hum sidebands of said power frequency, a source of tone energy having an assigned frequency, means in said transmitter for modulating said carrier waves with said tone energy, means for radiating said tone-modulated carrier waves together with said hum sidebands, a receiving station having a receiver for receiving said radiated tone-modulated carrier waves and hum sidebands, said receiver including a beating oscillator having frequency-adjusting means for cyclically sweeping its frequency over an assigned frequency range, demodulating means for combining said received energy with the output energy from said beating oscillator for producing intermediate frequency energy, control means for alternatively starting and stopping the operation of said frequency-adjusting means, first frequency-selective means for deriving energy having frequencies within an assigned band from said intermediate frequency energy and for applying them to said control means, said control means including first means actuated in response to the application thereto of said derived energy having magnitudes in excess of an assigned value, second frequency-selective means for extracting said tone energy from said intermediate frequency energy and for applying it to said control means, said control means including second means actuated in response to the application thereto of said extracted tone energy having magnitudes in excess of an assigned value, and third frequency-selective means for separating said hum sideband energy from said intermediate frequency energy and for applying said separated energy to said control means, said control means including third means actuated in response to the application thereto of said separated hum sideband energy having magnitudes in excess of an assigned value, said control means being responsive to the non-actuation of any one of said first and second means for effecting the starting of said frequency-adjusting means, said control means also being responsive to the actuation of said third means for effecting the starting of said frequency-adjusting means, said control means being further responsive only to the actuation of both said first means and said second means during the non-actuation of said third means for effecting the stopping of said frequency-adjusting means.

13. A radiant energy signaling system comprising in combination a transmitting station including a transmitter, a source of electric power having an assigned frequency, means for coupling said source to said transmitter, means in said transmitter for utilizing the power from said source for generating carrier waves, the generation of said carrier waves being accompanied by the incidental production of hum sidebands of said power frequency, means for radiating said carrier waves together with said power hum sidebands, a receiving station having a receiver for receiving said radiated carrier waves and hum sidebands, said receiver having tuning means including a beating oscillator, frequency-adjusting means for cyclically sweeping the frequency of said beating oscillator over an assigned frequency range, demodulating means for combining said received energy with the output energy from said beating oscillator for producing intermediate frequency, energy, an intermediate frequency amplifier, a circuit for varying the gain of said amplifier, said circuit being responsive to the tuning of said receiver by said tuning means to a power hum sideband for increasing the gain of said amplifier for producing an increase in the magnitude of said intermediate frequency energy, and control means for controlling the operation of said frequency adjusting means, said control means including marginal means actuated in response to said increase in the magnitude of said intermediate frequency energy.

14. A radiant energy signaling system comprising in combination a transmitting station including a transmitter, a source of electric power having an assigned frequency, means for coupling said source to said transmitter, means in said transmitter for utilizing the power from said source for generating carrier waves, the generation of said carrier waves being accompanied by the incidental production of hum sidebands of said power frequency, means for radiating said carrier waves together with said power hum sidebands, a receiving station having a receiver for receiving said radiated carrier waves and hum sidebands, said receiver having tuning means including a beating oscillator, frequency-adjusting means for cyclically sweeping the frequency of said beating oscillator over an assigned frequency range, demodulating means for combining said received energy with the output energy from said beating oscillator for producing intermediate frequency energy, an intermediate frequency amplifier, a circuit for varying the gain of said amplifier, said circuit being responsive to the tuning of said receiver to a power hum sideband for effecting an increase in the magnitude of said intermediate frequency energy, first control means for controlling the operation of said frequency-adjusting means, means for deriving control potentials from said circuit and for applying them to said first control means, and second control means for controlling the operation of said frequency-adjusting means, said second control means including means actuated in response to said increase in the magnitude of said intermediate frequency energy for superseding said first control means.

15. A radiant energy signaling system comprising in combination a transmitting station having means for radiating carrier waves, a receiving station having a receiver for receiving said radiated carrier waves, said receiver including a beating oscillator having frequency-adjusting means for cyclically sweeping its frequency over an assigned frequency range, demodulating means for combining said received carrier energy with the output energy from said beating oscillator for producing intermediate frequency energy, control means for controlling the operation of said frequency-adjusting means, frequency-selective means for deriving electric energy from said intermediate frequency energy, a source of electric energy of stable frequency, frequency-responsive means, and means for applying said derived electric energy and said stable electric energy to said frequency-responsive means, said frequency-responsive means being responsive to a frequency difference between said derived energy and said stable energy for producing control potentials, said control means including means actuated by said control potentials.

16. A radiant energy signaling system in accordance with claim 15 wherein said means included in said control means comprise marginal means, means for applying said control potentials to said marginal means, said marginal means being responsive only to the application thereto of control potentials having magnitudes in excess of an assigned value.

17. A radiant energy signaling system having at least two radiant energy signaling channels allocated thereto, a transmitting station having a source of electric signaling energy, a source of electric tone energy having an assigned frequency, means in said transmitter for modulating said signaling energy with said tone energy, means at said transmitting station for radiating said tone-modulated signaling energy over both of said signaling channels, a receiving station having a receiver for receiving the tone-modulated signaling energy radiated over both of said signaling channels, said receiver including a beating oscillator having frequency-adjusting means for cyclically sweeping its frequency over an assigned frequency range, control means for controlling the operation of said frequency-adjusting means, demodulating means for combining said received energy with the output energy from said beating oscillator for producing intermediate frequency energy, frequency-selective means for separating from said intermediate frequency energy the tone energy from each of said channels, frequency-responsive means in said receiver, means for applying said separated tone energy from each of said channels to said frequency-responsive means, said frequency-responsive means being responsive to a frequency difference between the frequency of said applied tone energy from one of said channels and the frequency of said applied tone energy from the other of said channels for producing control potentials, and means for applying said control potentials to said control means, said control means including means actuated by said control potentials.

18. A radiant energy signaling system having at least two radiant energy signaling channels allocated thereto a transmitting station having a source of electric signaling energy, a source of electric tone energy having an assigned frequency, means in said transmitter for modulating said signaling energy with said tone energy, means at said transmitting station for radiating said tone-modulated signaling energy over both of said signaling channels, a receiving station having a receiver for receiving the tone-modulated signaling energy radiated over both of said signaling channels, said receiver including a beating oscillator having frequency-adjusting means for cyclically sweeping its frequency over an assigned frequency range, control means for controlling the operation of said frequency-adjusting means, demodulating means for combining said received energy with the output energy from said beating oscillator for producing intermediate frequency energy, frequency-selective means for separating from said intermediate frequency energy the tone energy from each of said channels, means for deriving first control potentials from said separated tone energy from one of said channels, means for deriving second control potentials from said separated tone energy from the other of said channels, said control means including first and second electroresponsive means, means for applying said first control potentials to said first electroresponsive means, means for applying said second control potentials to said second electroresponsive means, said first and second electroresponsive means being responsive to applied control potentials having magnitudes in excess of an assigned value, frequency-responsive means, means for applying said separated tone energy from each of said channels to said frequency-responsive means, said frequency-responsive means being responsive to a frequency difference between the frequency of said applied tone energy from one of said channels and the frequency of said applied tone energy from the other of said channels for producing third control potentials, said control means including third electroresponsive means, and means for applying said third control potentials to said third electroresponsive means, said third electroresponsive means being responsive to said applied third control potentials having magnitudes in excess of an assigned value for superseding the operation of said first and second electroresponsive means.

References Cited in the file of this patent

UNITED STATES PATENTS

| | | |
|---|---|---|
| 2,368,778 | Purington | Feb. 6, 1945 |
| 2,506,869 | Gull | May 9, 1950 |
| 2,521,752 | Schwarz | Sept. 12, 1950 |
| 2,525,442 | Bischoff | Oct. 10, 1950 |
| 2,550,430 | Schwarz et al. | Apr. 24, 1951 |
| 2,584,578 | Gull | Feb. 5, 1952 |